US010108638B2

United States Patent
Chandrasekaran et al.

(10) Patent No.: US 10,108,638 B2
(45) Date of Patent: Oct. 23, 2018

(54) INTEGRATING VIRTUAL MACHINE FILE SYSTEM INTO A NATIVE FILE EXPLORER

(71) Applicant: VMware,Inc., Palo Alto, CA (US)

(72) Inventors: Rahul Chandrasekaran, San Jose, CA (US); Ravi Kant Cherukupalli, San Ramon, CA (US); Uttam Gupta, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 11 days.

(21) Appl. No.: 14/319,656

(22) Filed: Jun. 30, 2014

(65) Prior Publication Data

US 2015/0379039 A1 Dec. 31, 2015

(51) Int. Cl.
G06F 21/00 (2013.01)
G06F 17/30 (2006.01)
G06F 9/455 (2018.01)
G06F 21/62 (2013.01)

(52) U.S. Cl.
CPC .... G06F 17/30233 (2013.01); G06F 9/45558 (2013.01); G06F 21/6218 (2013.01)

(58) Field of Classification Search
CPC ............. G06F 21/53; G06F 2221/2141; G06F 2221/2149; G06F 3/0481; G06F 3/04842; H04L 67/10
See application file for complete search history.

(56) References Cited

U.S. PATENT DOCUMENTS

| 7,356,679 B1* | 4/2008 | Le ..................... G06F 17/30067 707/E17.01 |
| 2008/0201414 A1* | 8/2008 | Amir Husain .......... G06F 9/445 709/203 |
| 2015/0074536 A1* | 3/2015 | Varadharajan .... G06F 17/30233 715/734 |

* cited by examiner

Primary Examiner — Brandon S Hoffman
Assistant Examiner — Helai Salehi (57) ABSTRACT

In a computer-implemented method for integrating a file system of a virtual machine into a native file explorer of a client system, a virtualization infrastructure that manages at least one virtual machine is accessed. The virtual machine is discovered. The file system of virtual machine is accessed. The file system of virtual machines is integrated with the native file explorer of the client system.

16 Claims, 6 Drawing Sheets

INTEGRATING VIRTUAL MACHINE FILE SYSTEM INTO A NATIVE FILE EXPLORER

BACKGROUND

In computing, file systems are used to manage storage and retrieval of data. For example, host computer systems typically include a native file explorer for organizing files and directories. Similarly, in virtualization environments, a virtual machine will typically maintain its own file system that can be browsed by an administrator when the virtual machine is powered off.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

DESCRIPTION OF EMBODIMENTS

Reference will now be made in detail to various embodiments, examples of which are illustrated in the accompanying drawings. While various embodiments are discussed herein, it will be understood that they are not intended to be limiting. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding. However, embodiments may be practiced without one or more of these specific details. In other instances, well known methods, procedures, components, and circuits have not been described in detail as not to unnecessarily obscure aspects of the described embodiments.

Notation and Nomenclature

Unless specifically stated otherwise as apparent from the following discussions, it is appreciated that throughout the present Description of Embodiments, discussions utilizing terms such as "accessing," "discovering," "integrating," "authenticating," "receiving," "populating," "powering," "copying," "executing," or the like, often refer to the actions and processes of an electronic computing device or system, such as a host computer system, a virtualization infrastructure, a virtualization workstation, a virtualization management server or a virtual machine (VM), among others, of a virtualization infrastructure. In some embodiments, the electronic computing device/system may be a portion of a distributed computing system. The electronic computing device/system transmits, receives, stores, manipulates and/or transforms signals represented as physical (electrical) quantities within the circuits, components, logic, and the like, of the electronic computing device/system into other signals similarly represented as physical electrical quantities within the electronic computing device/system or within or transmitted to other electronic computing devices/systems.

Overview of Discussion

In accordance with various described embodiments, a file system of a virtual machine may be browsed through the native file explorer of any system (e.g., a client system or a client computer as described in the instant specification) that can access the virtual infrastructure. In a virtualization environment, a host system creates and maintains at least one guest system that is installed under the host system. A guest system, e.g., a virtual machine, is a virtualized computer environment executing on the host system, often executing as if it were running directly on physical hardware.

Currently, administrators of a virtualization environment are not able to browse the file system of powered on virtual machines through the native file explorer of any remote system, e.g., guest system. Moreover, administrators of such a virtualization environment are unable to perform many file management operations, such as read, write, or copy operations, across the host system and one or more virtual machines using the native file explorer. For example, an administrator can currently use the native file explorer of a client system to browse the file system of the client system, but is unable to browse or perform file management operations on any powered on virtual machines through the same native file explorer.

Conventional techniques provide products to browse the file system of the powered off virtual machines in a virtualization workstation (e.g., or VMware workstation) using the host file explorer. These products support reading through the file system of the virtual machine only when the virtual machine is powered off. There is currently no option available which can support an administrator to seamlessly browse through the file system of the powered on guest systems managed by the administrator using the native file explorer, and to perform read, write, copy operations across these systems. Currently, to copy file across guest systems and/or between a guest system and the client system, an administrator must learn complicated tools or techniques, such as sharing folders or performing a Network File System (NFS) mount. These techniques are typically difficult to learn and time consuming to execute.

Embodiments described herein relate to methods and systems for integrating a file system of a virtual machine into a native file explorer of a client system. The described embodiments access a virtualization infrastructure (e.g., a virtualization server or a virtualization workstation) that manages at least one virtual machine. The virtual machines managed by the virtualization infrastructure are discovered. The file system of at least one of the virtual machines is accessed. The file system of the virtual machine is integrated with the native file explorer of the client system.

Embodiments described herein allow an administrator to browse through the file system of a virtual machine managed by the administrator using the client system's native file explorer, thus providing a seamless experience for the administrator to view a guest file system. Moreover, embodiments also allow an administrator to perform file management operations, such as read, write, and/or copy operations, across all the guest systems and the client through the native file explorer, providing a similar experience as if the administrator is performing these operations across different drives in the client computer.

Herein various systems, methods and techniques for integrating a file system of a virtual machine into a native file explorer of a client system are described. Discussion begins with a description of systems for integrating a file system of a virtual machine into a native file explorer of a client system. Operation of various components of a system for integrating a virtual machine file system into native file explorer is further described in conjunction with description of various methods associated with integrating a virtual machine file system into native file explorer.

Figure 1:
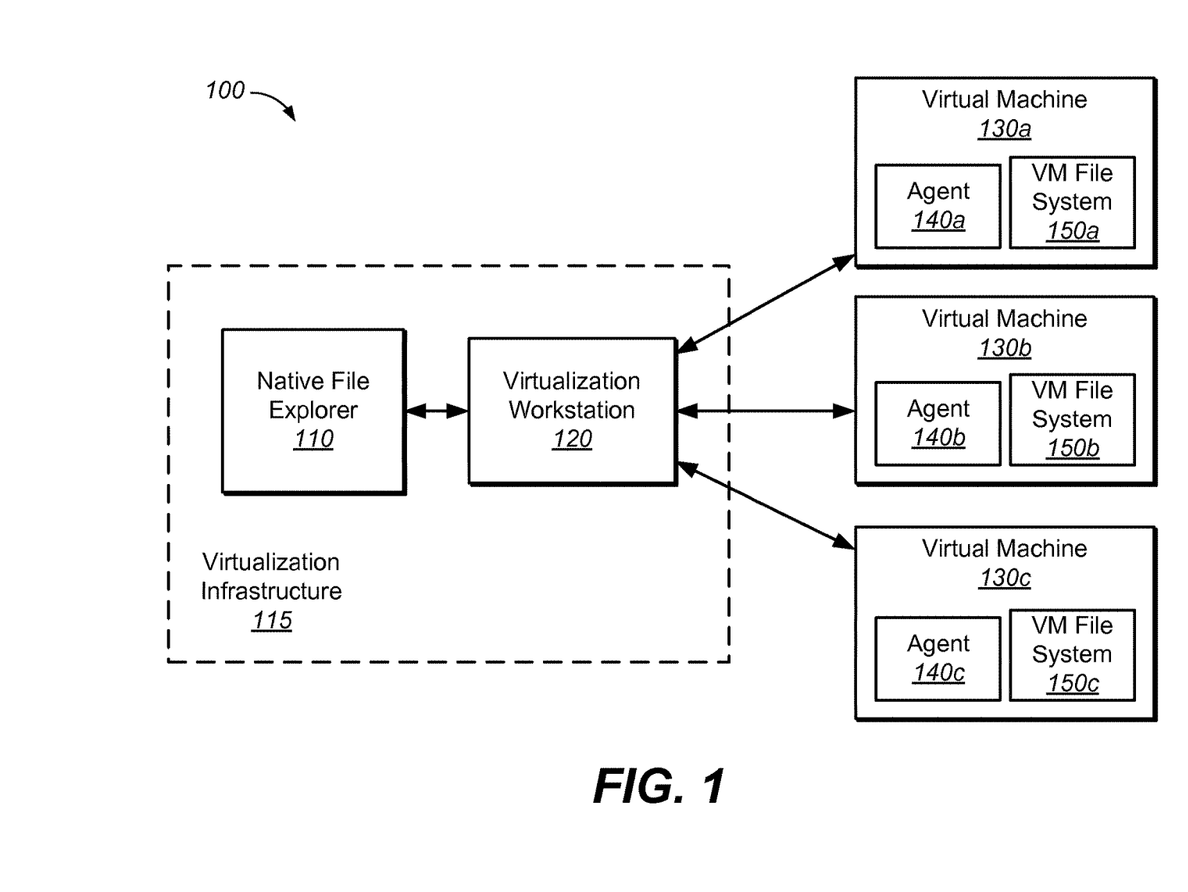
FIG. 1 is an example block diagram of a system for integrating a virtual machine file system into native file explorer using a virtualization workstation, in accordance with embodiments.

Example Systems for Integrating a File System of a Virtual Machine into a Native File Explorer of a Client System FIG. 1 is an example block diagram of a system 100 for integrating a virtual machine file system into a native file explorer of a client system using a virtualization workstation, in accordance with embodiments. As depicted, system 100 includes native file explorer 110, virtualization infrastructure 115, and virtual machines 130a-130c. It should be appreciated that the components of system 100 may be included within a single computing device or may be distributed across a distributed computing system. It should also be appreciated that system 100 may include any number of virtual machines, that virtualization infrastructure 115 may include different and/or additional components as those shown in FIG. 1, and that the number of components shown in FIG. 1 is for illustrative purposes only.

Native file explorer 110, also referred to herein as a file manager or a file browser, is a user interface application that allows for the management and browsing the file system (e.g., files and folders) of both client and guest systems. Native file explorer 110 is a component of and native to the client system and, as described in various embodiments herein, may be integrated with file systems of guest systems such that the guest file systems may be browsed through native file explorer 110 of the client system. In the embodiment illustrated in FIG. 1, system 100 is a host system, as virtualization infrastructure 115 and native file explorer 110 are running on the same system.

In various embodiments, native file explorer 110 allows for the performance of file management operations, such as read, write, or copy operations. An example of a native file explorer is Microsoft Windows Explorer where Microsoft Windows is the operating system of the client system. For example, native file explorer 110 allows a user (e.g., and administrator) to navigate through the hierarchy of the file system, allowing access to the files and folders of the file system.

As shown in FIG. 1, virtualization infrastructure 115 includes virtualization workstation 120. Virtualization workstation 120 enables the creation and management of multiple virtual machines on a single physical computing device. A virtual machine can execute its own operating system, such as Microsoft Windows or Linux, independent of the operating system of the host system. An example virtualization workstation 120 is VMware Workstation. In another embodiment, as similarly depicted in FIG. 2, virtualization infrastructure 115 can include one or more virtualization servers.

As shown, system 100 includes virtual machines 130a-130c, where each virtual machine includes an associated file system 150a-150c, respectively. The file systems 150a-150c are accessible by virtualization workstation 120. In one embodiment, access to file systems 150a-150c is subject to authentication that such access is permitted. In one embodiment, virtual machines 130a-130c include agents 140a-140c, respectively, that are configured to communicate with virtualization workstation 120. Agents 140a-140c are operable to carry out commands from virtualization workstation 120.

Native file explorer 110 is configured to communicate with virtualization workstation 120. In one embodiment, virtualization workstation 120 provides an application programming interface (API) for interacting with native file explorer 110. For example, where virtualization workstation 120 is a VMware Workstation, file explorer 110 may communicate with virtualization workstation 120 using the VMware Managed Object Design Language (VMODL) API. Continuing with the instant example, agents 140a-140c may be implemented using VMware Tools.

In one embodiment, native file explorer 110 presents a tree view of the file system of the client system and tree views of the file systems of any virtual machines managed by virtualization workstation 120. For example, the directory of the client/host system is accessible under the heading "My Computer" and the directory of the virtual machines managed by virtualization workstation 120 is accessible under the heading "My Virtual Places." In one embodiment, the levels of the tree view are selectable such that files or folders in a level are not shown until an expansion of the level is requested. For example, a particular level of the file system of a virtual machine is shown in response to receiving a user interaction to expand the directory view of the file system at the particular level. In this manner, the file system of a virtual machine is browsed in native file explorer 110 in a similar way as the file system of the client/host system is browsed in native file explorer 110.

Native file explorer 110 is configured to interact with virtualization workstation 120 to receive information on the file systems on virtual machines 130a-130c. Virtualization workstation 120 is accessed by native file explorer 110. In one embodiment, access to virtualization workstation 120 is authenticated for allowing access to a listing of virtual machines managed by virtualization workstation 120. If access is not authenticated, virtualization workstation 120 is not accessible by native file explorer 110, and a listing of virtual machines managed by virtualization workstation 120 is not provided to native file explorer 110.

Virtualization workstation 120 discovers the virtual machines, e.g., virtual machines 130a-130c, that are managed by virtualization workstation 120. In one embodiment, virtualization workstation 120 is accessed in response to a user interaction with virtualization workstation 120 in native file explorer 110. In another embodiment, virtualization workstation 120 is accessed automatically in response to a user interaction opening native file explorer 110. Native file explorer 110 receives the listing of virtual machines managed by virtualization workstation 120.

In various embodiments, agents 140a-140c are configured to perform file management operations on file systems 150a-150c, respectively. For example, agents 140a-140c are operable to access file systems 150a-150c, and perform other file management operations such as read, write, or copy operations.

In one embodiment, native file explorer 110 provides a listing of the virtual machines managed by virtualization workstation 120, e.g., virtual machines 130a-130c. A file system of at least one virtual machine, e.g., file system 150a of virtual machine 130a, is accessed. In one embodiment, virtualization workstation communicates with agent 140a to access file system 150a. In one embodiment, file system 150a is accessed in response to a user interaction with virtual machine 130a in native file explorer 110. In another embodiment, file system 150a is accessed automatically in response to a user interaction opening native file explorer 110.

In one embodiment, if virtual machine 130a is powered off, native file explorer sends a power on command to virtualization workstation 120 to power on virtual machine 130a.

In one embodiment, access to virtual machine 130a is authenticated for allowing access to file system 150a. If access is not authenticated, this file system 150a, is not accessible by native file explorer 110. In one embodiment, authentication is performed using agent 140a of virtual machine 130a.

Subsequent accessing file system 150a, file system 150a is integrated with native file explorer 110. Integration with native file explorer 110 allows file system 150a to be accessed in the same manner as the file system of the client system on which native file explorer 110 is resident. For example, a listing of virtual machines 130a-130c is provided to native file explorer 110, and native file explorer 100 is populated with the listing. File systems 150a-150c are accessible via native file explorer 110.

In one embodiment, responsive to a query of file system 150a of virtual machine 130a, information of file system 150a is received. For example, where a particular folder in file system 150a is selected in native file explorer 110, e.g., the contents of the folder are queried, information including the contents of the folder is received at native file explorer 110. Native file explorer 110 of the host system is populated with the information of file system 150a, e.g., the contents of the folder are populated into native file explorer 110. In this manner, file system 150a can be browsed in native file explorer 110.

It should be appreciated that in various embodiments file systems 150a-150c are dynamically updatable, as is the file system of the client system. Native file explorer 110 may be refreshed, updating native file explorer 110 with the current state of file systems 150a-150c. For example, this can be performed using the refresh view command of native file explorer 110.

In one embodiment, the information of file system 150a of virtual machine 130a is received on a level-by-level basis. In other words, the information is received at native file explorer 110 responsive to a query of a particular level of file system 150a. In another embodiment, native file explorer 110 is populated with the contents of file system 150a responsive to a selection of file system 150a. It should be appreciated that native file explorer 110 may be populated with any portion of file system 150a, and that the described embodiments are for illustrative purposes and not intended to be limiting.

As described above, embodiments also allow an administrator to perform file management operations, such as read, write, and/or copy operations, across guest systems and the client system through the native file explorer. In one embodiment, responsive to a read operation initiated at native file explorer 110 on a file of file system 150b of virtual machine 130b, native file explorer 110 accesses the file being read. Virtualization workstation 120 sends a command to agent 140b to copy the file to the client system.

In one embodiment, where the file utilizes an application to be read (e.g., a word processor document or a spreadsheet file), an application on the client system that performs the read operation is executed. In another embodiment, where the operation to be performed is a write operation, an application on the client system that performs the write operation is executed. In one embodiment, the execution of the application is automatically performed responsive to the file being copied to the host system. In another embodiment, where the file itself is an executable program, the file executes on the client system.

In one embodiment, responsive to a copy operation initiated at native file explorer 110 for copying a file from virtual machine 130a to virtual machine 130c, native file explorer 110 accesses the file being copied. The file is copied from virtual machine 130a to the client system, and then is copied from the client system to virtual machine 130c. In one embodiment, virtualization workstation 120 sends a command to agent 140a to copy the file to the client system. Virtualization workstation 120 then directs agent 140c to copy the file from client system to virtual machine 130c.

Figure 2:
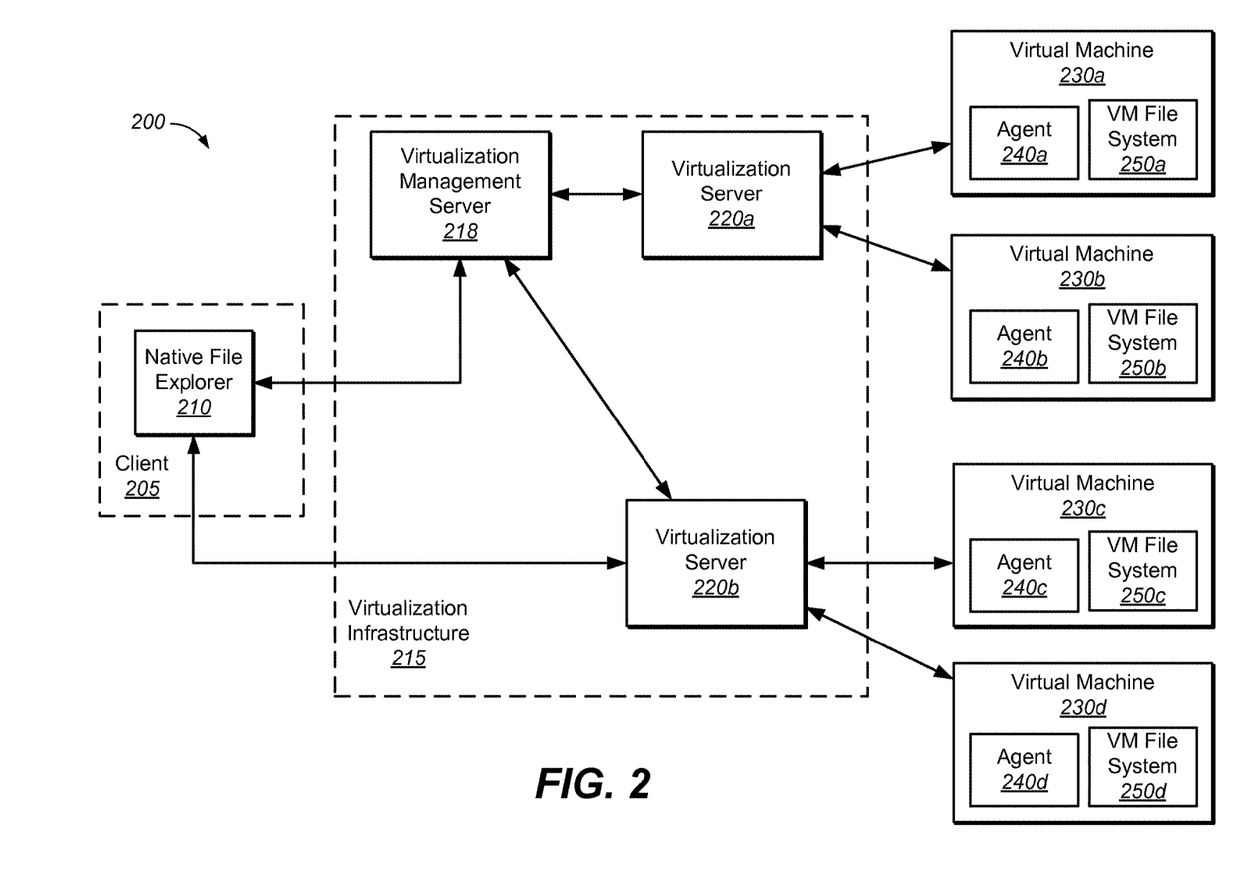
FIG. 2 is an example block diagram of a system for integrating a virtual machine file system into native file explorer using a virtualization server, in accordance with embodiments.

FIG. 2 is an example block diagram of a system 200 for integrating a virtual machine file system into a native file explorer 210 of a client system 205 using a virtualization server, in accordance with embodiments. As depicted, system 200 includes native file explorer 210 in client system 205, virtualization infrastructure 215, and virtual machines 230a-230d. It should be appreciated that the components of system 200 may be included within a single computing device or may be distributed across a distributed computing system. It should also be appreciated that system 200 may include any number of virtual machines, that virtualization infrastructure 215 may include different and/or additional components as those shown in FIG. 2, and that the number of components shown in FIG. 2 is for illustrative purposes only. It should also be appreciated that client system 205 may be a physical computing device or a virtual computing device, or any combination thereof.

Native file explorer 210, also referred to herein as a file manager or a file browser, is a user interface application that allows for the management and browsing the file system (e.g., files and folders) of client system 205 or a guest system, and operates in a similar fashion as native file explorer 110 of FIG. 1. Native file explorer 210 is a component of and native to client system 205 and, as described in various embodiments herein, may be integrated with file systems of guest systems such that the guest file systems may be browsed through native file explorer 210 of client system 205.

As depicted in FIG. 2, virtualization infrastructure 215 includes virtualization management server 218 that manages virtualization servers 220a and 220b, themselves managing multiple virtual machines. However, it should be appreciated that embodiments described herein may utilize one or more virtualization servers, and zero, one or more virtualization management servers. In one embodiment, system 200 includes a virtualization server, e.g., virtualization server 220a. In another embodiment, system 200 includes more than one virtualization server, e.g., virtualization servers 220a and 220b. In various embodiments, system 200 includes a virtualization management server 218.

Virtualization management server 218 and virtualization servers 220a and 220b, alone or in combination, enable the creation and management of multiple virtual machines on a single physical computing device or a distributed computing environment. An example virtualization management server 218 is VMware vCenter server and examples of virtualization servers 220a and 220b are VMware ESX and VMware ESXi.

As shown, system 200 includes virtual machines 230a-230d, where each virtual machine includes an associated file system 250a-250d, respectively. The file systems 250a and 250b are accessible by virtualization server 220a and file systems 250c and 250d are accessible by virtualization server 220b. In one embodiment, access to file systems 250a-250d is subject to authentication that such access is permitted. In one embodiment, virtual machines 230a-230d include agents 240a-240d, respectively, that are configured to communicate with virtualization servers 220a and 220b. Agents 240a-240d are operable to carry out commands from virtualization servers 220a and 220b. It should be appreciated that in various embodiments, agents 240a-240d are operable to carry out commands from virtualization management server 218 via virtualization servers 220a and 220b.

Native file explorer 210 is configured to communicate with virtualization management server 218 and/or virtualization servers 220a and 220b. In one embodiment, virtualization management server 218 and/or virtualization servers 220a and 220b provides an API for interacting with native file explorer 210. For example, where virtualization management server 218 is VMware vCenter server and examples of virtualization servers 220a and 220b are VMware ESX, native file explorer 210 may communicate with virtualization management server 218 and/or virtualization servers 220a and 220b using the VMware Managed Object Design Language (VMODL) API. Continuing with the instant example, agents 240a-240d may be implemented using VMware Tools.

In one embodiment, native file explorer 210 presents a tree view of the file system of client system 205 and tree views of the file systems of any virtual machines managed by virtualization infrastructure 215. For example, the directory of client system 205 is accessible under the heading "My Computer" and the directory of the virtual machines managed by virtualization infrastructure 215 is accessible under the heading "My Virtual Places." In one embodiment, the levels of the tree view are selectable such that files or folders in a level are not shown until an expansion of the level is requested. For example, a particular level of the file system of a virtual machine is shown in response to receiving a user interaction to expand the directory view of the file system at the particular level. In this manner, the file system of a virtual machine is browsed in native file explorer 210 in a similar way as the file system of client system 205 is browsed in native file explorer 210.

Native file explorer 210 is configured to interact with virtualization infrastructure 215 to receive information on the file systems on virtual machines 230a-230d. Virtualization infrastructure 215 is accessed by native file explorer 210. In one embodiment, access to virtualization infrastructure 215 is authenticated for allowing access to a listing of virtual machines managed by virtualization infrastructure 215. If access is not authenticated, virtualization infrastructure 215 is not accessible by native file explorer 210, and a listing of virtual machines managed by virtualization infrastructure 215 is not provided to native file explorer 210.

Virtualization infrastructure 215 discovers the virtual machines, e.g., virtual machines 230a-230c, that are managed by virtualization infrastructure 215. In one embodiment, virtualization infrastructure 215 is accessed responsive to a user interaction with virtualization infrastructure 215 in native file explorer 210. In another embodiment, virtualization infrastructure 215 is accessed automatically responsive to a user interaction opening native file explorer 210. Native file explorer 210 receives the listing of virtual machines managed by virtualization infrastructure 215.

In various embodiments, agents 240a-240d are configured to perform file management operations on file systems 250a-250d, respectively. For example, agents 240a-240d are operable to access file systems 250a-250d, and perform other file management operations such as read, write, or copy operations.

In one embodiment, native file explorer 210 provides a listing of the virtual machines managed by virtualization infrastructure 215, e.g., virtual machines 230a-230d. A file system of at least one virtual machine, e.g., file system 250a of virtual machine 230a, is accessed. In one embodiment, virtualization infrastructure 215 communicates with agent 240a to access file system 250a. In one embodiment, file system 250a is accessed in response to a user interaction with virtual machine 230a in native file explorer 210. In another embodiment, file system 250a is accessed automatically responsive to a user interaction opening native file explorer 210.

In one embodiment, if virtual machine 230a is powered off, native file explorer 210 sends power on command to virtualization infrastructure 215 to power on virtual machine 230a.

In one embodiment, access to virtual machine 230a is authenticated for allowing access to file system 250a. If access is not authenticated, this file system 250a, is not accessible by native file explorer 210. In one embodiment, authentication is performed using agent 240a of virtual machine 230a.

Subsequent to accessing file system 250a, file system 250a is integrated with native file explorer 210. Integration with native file explorer 210 allows file system 250a to be accessed in the same manner as the file system of client system 205 on which native file explorer 210 is resident. For example, a listing of virtual machines 230a-230c is provided to native file explorer 210, and native file explorer 200 is populated with the listing. File systems 250a-250c are accessible via native file explorer 210.

In one embodiment, responsive to a query of file system 250a of virtual machine 230a, information of file system 250a is received. For example, where a particular folder in file system 250a is selected in native file explorer 210, e.g., the contents of the folder are queried, information including the contents of the folder is received at native file explorer 210. Native file explorer 210 of client system 205 is populated with the information of file system 250a, e.g., the contents of the folder are populated into native file explorer 210. In this manner, file system 250a can be browsed in native file explorer 210.

It should be appreciated that in various embodiments file systems 250a-250c are dynamically updatable, as is the file system of client system 205. Native file explorer 210 may be refreshed, updating native file explorer 210 with the current state of file systems 250a-250c. For example, this can be performed using the refresh view command of native file explorer 210.

In one embodiment, the information of file system 250a of virtual machine 230a is received on a level-by-level basis. In other words, the information is received at native file explorer 210 responsive to a query of a particular level of file system 250a. In another embodiment, native file explorer 210 is populated with the contents of file system 250a responsive to a selection of file system 250a. It should be appreciated that native file explorer 210 may be populated with any portion of file system 250a, and that the described embodiments are for illustrative purposes and not intended to be limiting.

As described above, embodiments also allow an administrator to perform file management operations, such as read, write, and/or copy operations, across guest systems and client system through the native file explorer. In one embodiment, responsive to a read operation initiated at native file explorer 210 on a file of file system 250b of virtual machine 230b, native file explorer 210 accesses the file being read. Virtualization infrastructure 215 sends a command to agent 240b to copy the file to client system.

In one embodiment, where the file utilizes an application to be read (e.g., a word processor document or a spreadsheet file), an application on client system 205 that performs the read operation is executed. In another embodiment, where the operation to be performed is a write operation, an application on client system 205 that performs the write operation is executed. In one embodiment, the execution of the application is automatically performed responsive to the file being copied to client system 205. In another embodiment, where the file itself is an executable program, the file executes on client system 205.

In one embodiment, responsive to a copy operation initiated at native file explorer 210 for copying a file from virtual machine 230a to virtual machine 230c, native file explorer 210 accesses the file being copied. The file is copied from virtual machine 230a to client system 205, and then is copied from client system 205 to virtual machine 230c. In one embodiment, virtualization infrastructure 215 sends a command to agent 240a to copy the file to client system 205. Virtualization infrastructure 215 then directs agent 240c to copy the file from client system 205 to virtual machine 230c.

Figure 3:
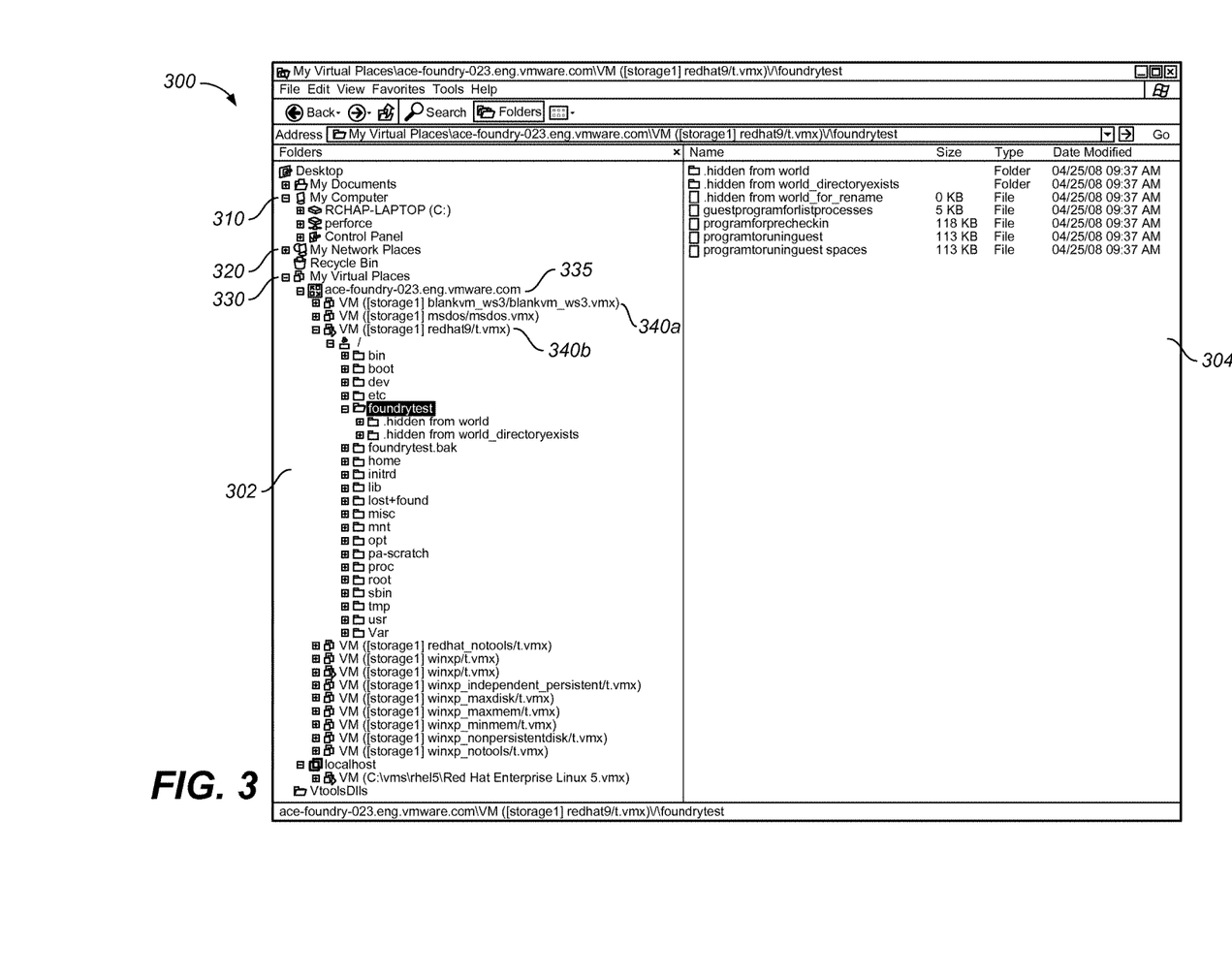
FIG. 3 is an example screen shot of a native file explorer integrating a virtual machine file system, in accordance with embodiments.

FIG. 3 is an example screen shot of a native file explorer 300 integrating a virtual machine file system, in accordance with embodiments. File explorer 300 includes pane 302, illustrating a tree view of the directory system including file systems, and pane 304, illustrating the contents of the selected folder. The tree view includes host system 310, labelled as "My Computer," network systems 320, labelled as "My Network Places," and guest systems 330, labelled as "My Virtual Places."

The guest systems are included under virtualization manager 335. As shown, virtualization manager 335 is a management component of a virtualization infrastructure, e.g., virtualization workstation or a virtualization server. However, it should be appreciated that a virtualization management server may be included in native file explorer 300 above one or more virtualization servers. Moreover, it should be appreciated that native file explorer 300 may include multiple virtualization managers, and that the number depicted in FIG. 3 is only for illustrative purposes.

Moreover, for illustrative purposes, FIG. 3 includes virtual machines 340a and 340b. As depicted, virtual machine 340a is not expanded and virtual machine 340b is expanded to show multiple levels of the file system.

Example Methods of Operation

The following discussion sets forth in detail the operation of some example methods of operation of embodiments. With reference to FIGS. 4 through 8, flow diagram 400, 500, 600, 700 and 800 illustrate example procedures used by various embodiments. Flow diagrams 400, 500, 600, 700 and 800 include some procedures that, in various embodiments, are carried out by a processor under the control of computer-readable and computer-executable instructions. In this fashion, procedures described herein and in conjunction with flow diagrams 500, 600, 700 and/or 800 are, or may be, implemented using a computer, in various embodiments. The computer-readable and computer-executable instructions, e.g., computer readable program code, can reside in any tangible computer readable storage media. Some non-limiting examples of tangible computer readable storage media include random access memory, read only memory, magnetic disks, solid state drives/"disks," and optical disks, any or all of which may be employed. The computer-readable and computer-executable instructions, which reside on tangible computer readable storage media, are used to control or operate in conjunction with, for example, one or some combination of processors of a computing system. It is appreciated that the processor(s) may be physical or virtual or some combination (it should also be appreciated that a virtual processor is implemented on physical hardware).

Although specific procedures are disclosed in flow diagrams 400, 500, 600, 700 and 800, such procedures are examples. That is, embodiments are well suited to performing various other procedures or variations of the procedures recited in flow diagram 500, 600, 700 and/or 800. Likewise, in some embodiments, the procedures in flow diagrams 500, 600, 700 and/or 800 may be performed in an order different than presented and/or not all of the procedures described in one or more of these flow diagrams may be performed. It is further appreciated that procedures described in flow diagram 500, 600, 700 and/or 800 may be implemented in hardware, or a combination of hardware with firmware and/or software.

Figure 4:
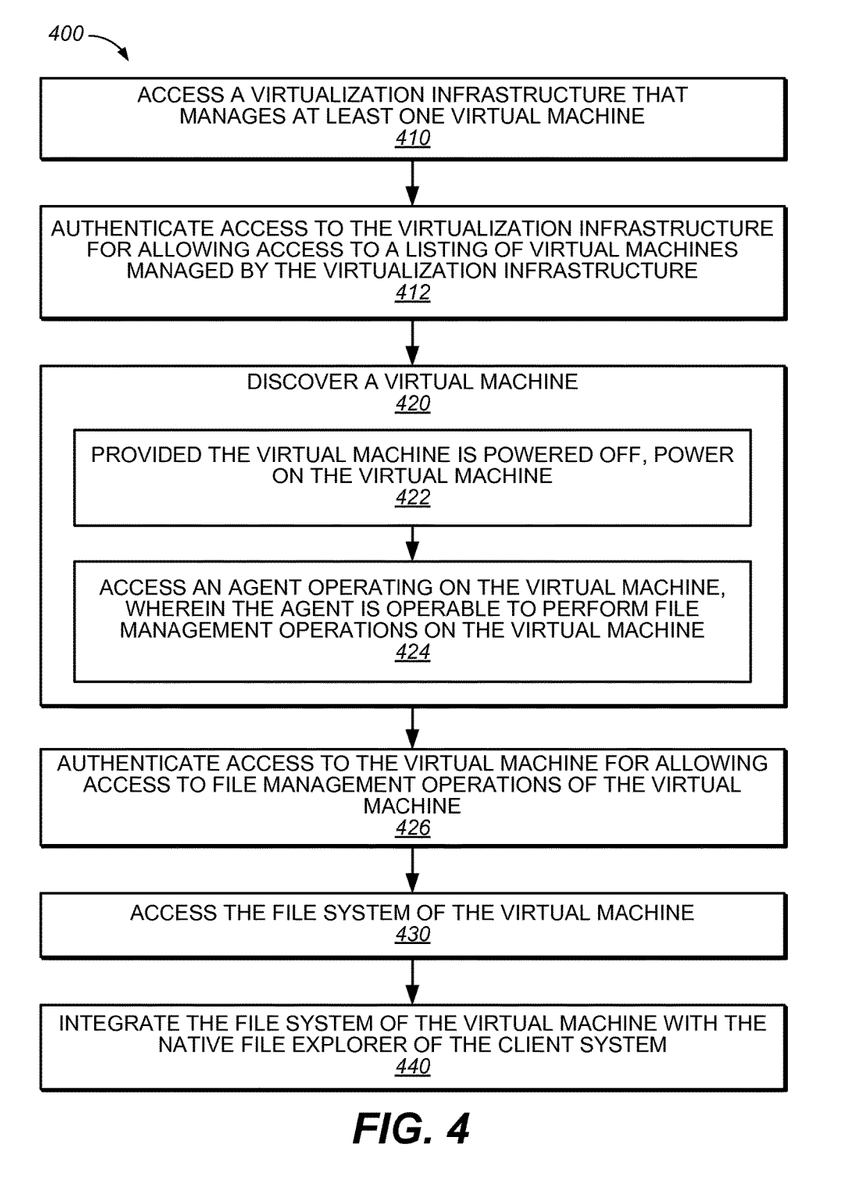
FIG. 4 is a flow diagram of a method for integrating a file system of a virtual machine into a native file explorer of a host system, in accordance with various embodiments.

FIG. 4 is a flow diagram 400 of a method for integrating a file system of a virtual machine into a native file explorer of a client system, in accordance with various embodiments.

At procedure 410 of flow diagram 400, a virtualization infrastructure that manages at least one virtual machine is accessed. In one embodiment, at procedure 412, access to the virtualization infrastructure is authenticated for allowing access to a listing of virtual machines managed by the virtualization infrastructure. In one embodiment, the virtualization infrastructure includes a virtualization workstation. In one embodiment, the virtualization infrastructure includes a virtualization server. In one embodiment, virtualization infrastructure also includes a virtualization management server.

At procedure 420, at least one virtual machine is discovered. In one embodiment, as shown at procedure 422, provided the virtual machine is powered off, the virtual machine is powered on. In one embodiment, as shown at procedure 424, an agent operating on the virtual machine is accessed, wherein the agent is operable to perform file management operations on the virtual machine.

In one embodiment, as shown at procedure 426, access to the virtual machine is authenticated for allowing access to file management operations on the virtual machine.

At procedure 430, the file system of the virtual machine is accessed. At procedure 440, the file system of the virtual machine is integrated with the native file explorer of the host system. In various embodiments, flow diagram 400 proceeds to at least one of flow diagrams 500, 600 and 700, as described below.

It should be appreciated that various procedures described herein in flow diagrams 500, 600, 700 and/or 800, may be performed for a plurality of virtual machines. For example, where a virtualization infrastructure manages a plurality of virtual machines, discovering the virtual machine as recited in procedure 420, accessing the file system of the virtual machine as recited in procedure 430, and integrating the file system of virtual machine with the native file explorer of the client system as recited in procedure 440, may be performed for all or a portion of the plurality of virtual machines managed by the virtualization infrastructure.

Figure 5:
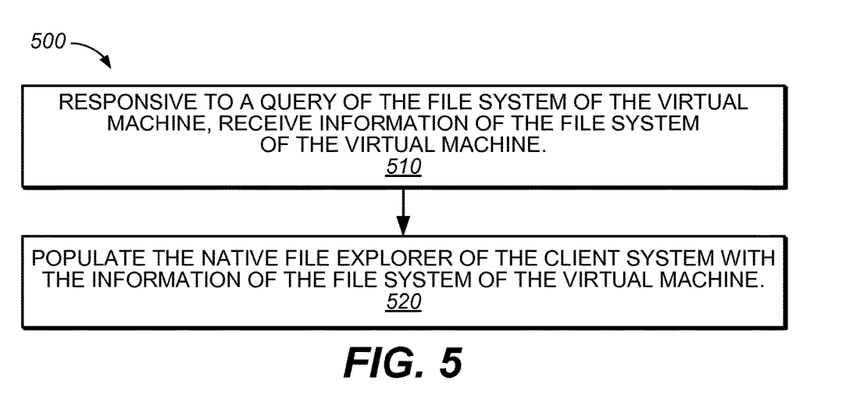
FIG. 5 is flow diagram of a method for populating a native file explorer of a host system with a file system of a virtual machine, in accordance with various embodiments.

FIG. 5 is flow diagram 500 of a method for populating a native file explorer of a client system with a file system of a virtual machine, in accordance with various embodiments.

At procedure 510 of flow diagram 500, responsive to a query of the file system of the virtual machine, information of the file system of the virtual machine is received. At procedure 520, the native file explorer of the client system is populated with the information of the file system of the virtual machine. In one embodiment, the information of the file system of the virtual machine is received on a level-by-level basis.

Figure 6:
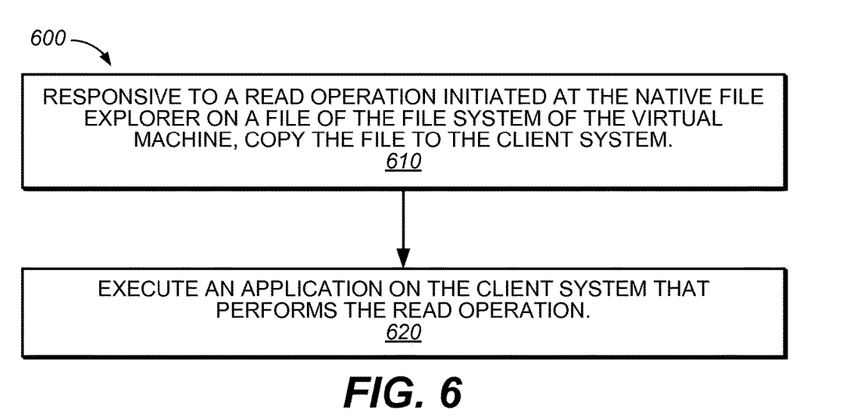
FIG. 6 is a flow diagram of a method for performing a read operation initiated at a native file explorer on a file of a file system of a virtual machine, in accordance with various embodiments.

FIG. 6 is a flow diagram 600 of a method for performing a read operation initiated at a native file explorer on a file of a file system of a virtual machine, in accordance with various embodiments.

At procedure 610 of flow diagram 600, responsive to a read operation initiated at the native file explorer on a file of the file system of the virtual machine, the file is copied to the client system. At procedure 620, an application on the client system that performs the read operation is executed.

Figure 7:
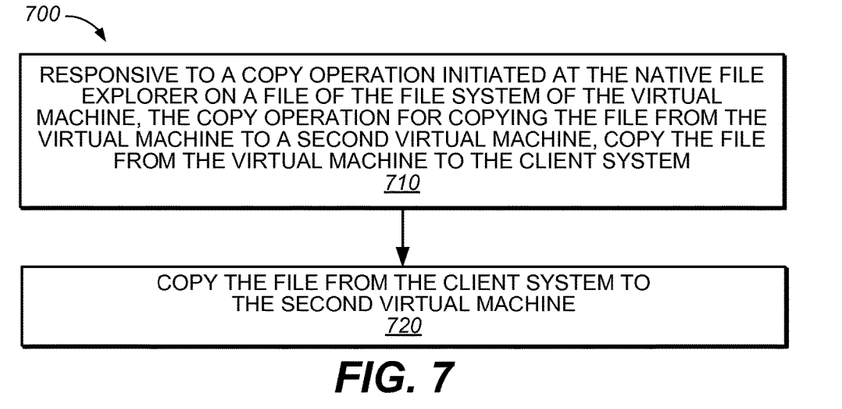
FIG. 7 is a flow diagram of a method for performing a copy operation initiated at a native file explorer on a file of a file system of a virtual machine for copying the file from the virtual machine to a second virtual machine, in accordance with various embodiments.

FIG. 7 is a flow diagram 700 of a method for performing a copy operation initiated at a native file explorer on a file of a file system of a virtual machine for copying the file from the virtual machine to a second virtual machine, in accordance with various embodiments.

At procedure 710 of flow diagram 700, responsive to a copy operation initiated at the native file explorer on a file of the file system of the virtual machine, the copy operation for copying the file from the virtual machine to a second virtual machine, the file is copied from the virtual machine to the client system. At procedure 720, the file is copied from the client system to the second virtual machine.

Figure 8:
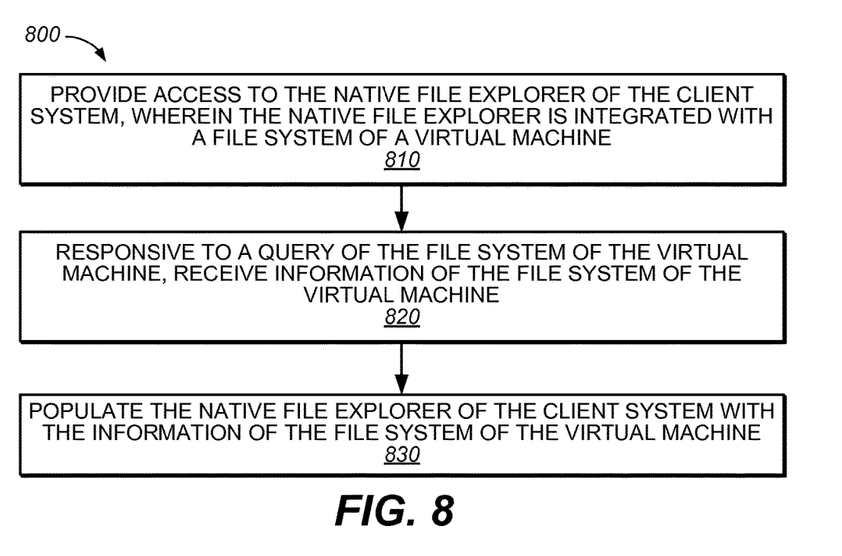
FIG. 8 is flow diagram of a method for populating a native file explorer of a host system with a file system of a virtual machine, in accordance with various embodiments.

FIG. 8 is flow diagram 800 of a method for populating a native file explorer of a client system with a file system of a virtual machine, in accordance with various embodiments.

At procedure 810 of flow diagram 800, access to the native file explorer of the client system is provided, wherein the native file explorer is integrated with a file system of at least one virtual machine. At procedure 820, responsive to a query of the file system of a virtual machine, information of the file system of the virtual machine is received. At procedure 830, the native file explorer of the client system is populated with the information of the file system of the virtual machine. In one embodiment, the information of the file system of the virtual machine is received on a level-by-level basis. In various embodiments, flow diagram 400 proceeds to at least one of flow diagrams 600 and 700, as described above.

Example embodiments of the subject matter are thus described. Although various embodiments of the have been described in a language specific to structural features and/or methodological acts, it is to be understood that the appended claims are not necessarily limited to the specific features or acts described above. Rather, the specific features and acts described above are disclosed as example forms of implementing the claims and their equivalents.

What is claimed is:

1. A computer-implemented method for integrating a file system of a virtual machine into a native file explorer of a client system, the method comprising:
   accessing a virtualization infrastructure that manages at least one virtual machine;
   discovering the virtual machine, wherein, provided the virtual machine is powered off, as part of the discovering, the powered off virtual machine is powered on in response to a command sent from the native file explorer;
   accessing the file system of the virtual machine, wherein the virtual machine is powered on;
   integrating the file system of the virtual machine with the native file explorer of the client system;
   responsive to a query of the file system of the virtual machine, receiving information of the file system of the virtual machine;
   populating the native file explorer of the client system with the information of the file system of the virtual machine;
   displaying an expandable tree view comprising a directory of the file system of the virtual machine and comprising a directory of a file system of the client system within a first pane of the native file explorer, wherein the file system of the virtual machine and the file system of the client system are integrated into the expandable tree view, wherein a level of the expandable tree view is displayed within the first pane of the native file explorer responsive to a user interaction to display the level; and
   responsive to selection of a folder of the file system of the virtual machine within the first pane, displaying contents of the folder within a second pane of the native file explorer.

2. The method of claim 1 further comprising:
   authenticating access to the virtualization infrastructure for allowing access to a listing of virtual machines managed by the virtualization infrastructure.

3. The method of claim 1 further comprising:
   authenticating access to the virtual machine for performing file management operations on the file system of the virtual machine.

4. The method of claim 1, wherein the accessing the file system of the virtual machine comprises:
   accessing an agent operating on the virtual machine, wherein the agent is operable to perform file management operations on the virtual machine.

5. The method of claim 1, wherein the receiving of the information of the file system of the virtual machine further comprises receiving the information on a level-by-level basis.

6. The method of claim 1, wherein the virtualization infrastructure comprises a virtualization server.

7. The method of claim 1, wherein the virtualization infrastructure comprises a virtualization workstation.

8. The method of claim 1, further comprising:
responsive to a read operation initiated at the native file explorer on a file of the file system of the virtual machine, copying the file to the client system; and
executing an application on the client system that performs the read operation.

9. The method of claim 1, further comprising:
responsive to a copy operation initiated at the native file explorer on a file of the file system of the virtual machine, the copy operation for copying the file from the virtual machine to a second virtual machine, copying the file from the virtual machine to the client system; and
copying the file from the client system to the second virtual machine.

10. The method of claim 1, wherein the discovering the virtual machine, the accessing the file system of the virtual machine, and the integrating the file system of the virtual machine with the native file explorer of the client system, are performed for a plurality of virtual machines managed by the virtualization infrastructure.

11. A computer-implemented method for providing file management operations of a virtual machine in a native file explorer of a client system, the method comprising:
providing access to the native file explorer of the client system, wherein the native file explorer is integrated with a file system of the virtual machine, wherein the virtual machine is powered on;
responsive to a query of the file system of the virtual machine, receiving information of the file system of the virtual machine on a level-by-level basis;
populating the native file explorer of the client system with the information of the file system of the virtual machine;
displaying an expandable tree view comprising a directory of the file system of the virtual machine and comprising a directory of a file system of the client system within a first pane of the native file explorer, wherein the file system of the virtual machine and the file system of the client system are integrated into the expandable tree view, wherein a level of the expandable tree view is displayed within the first pane of the native file explorer responsive to a user interaction to display the level; and
responsive to selection of a folder of the file system of the virtual machine within the first pane, displaying contents of the folder within a second pane of the native file explorer.

12. The method of claim 11, further comprising:
responsive to a read operation initiated at the native file explorer on a file of the file system of the virtual machine, copying the file to the client system; and
executing an application on the client system that performs the read operation.

13. The method of claim 11, further comprising:
responsive to a copy operation initiated at the native file explorer on a file of the file system of the virtual machine for copying the file from the virtual machine to a second virtual machine, copying the file from the virtual machine to the client system; and
copying the file from the client system to the second virtual machine.

14. A non-transitory computer readable storage medium having computer readable program code stored thereon for causing a computer system to perform a method for integrating a file system of a virtual machine into a native file explorer of a client system, the method comprising:
accessing a virtualization infrastructure that manages at least one virtual machine;
discovering a virtual machine, wherein, provided the virtual machine is powered off, as part of the discovering the powered off virtual machine is powered on in response to a command sent from the native file explorer;
accessing the file system of the virtual machine, wherein the virtual machine is powered on;
integrating the file system of the virtual machine with the native file explorer of the client system;
responsive to a query of the file system of the virtual machine, receiving information of the file system of the virtual machine;
populating the native file explorer of the client system with the information of the file system of the virtual machine;
displaying an expandable tree view comprising a directory of the file system of the virtual machine and comprising a directory of a file system of the client system within a first pane of the native file explorer, wherein the file system of the virtual machine and the file system of the client system are integrated into the expandable tree view, wherein a level of the expandable tree view is displayed within the first pane of the native file explorer responsive to a user interaction to display the level; and
responsive to selection of a folder of the file system of the virtual machine within the first pane, displaying contents of the folder within a second pane of the native file explorer.

15. The computer readable storage medium of claim 14, wherein the method further comprises:
authenticating access to the virtualization infrastructure for allowing access to a listing of virtual machines managed by the virtualization infrastructure; and
authenticating access to the virtual machine for allowing access to file management operations of the virtual machine.

16. The computer readable storage medium of claim 14, wherein the accessing the file system of the virtual machine comprises:
accessing an agent operating on the virtual machine, wherein the agent is operable to perform file management operations on the virtual machine.

* * * * *